(12) United States Patent
Nakamura et al.

(10) Patent No.: US 6,643,118 B2
(45) Date of Patent: Nov. 4, 2003

(54) METHOD FOR MAKING BARIUM TITANATE POWDER, BARIUM TITANATE POWDER PREPARED BY THE METHOD, DIELECTRIC CERAMIC COMPACT, AND MONOLITHIC CERAMIC CAPACITOR

(75) Inventors: Yasunari Nakamura, Yasu-gun (JP); Masami Yabuuchi, Yokaichi (JP)

(73) Assignee: Murata Manufacturing Co. Ltd (JP)

( * ) Notice: Subject to any disclaimer, the term of this patent is extended or adjusted under 35 U.S.C. 154(b) by 30 days.

(21) Appl. No.: 10/026,054

(22) Filed: Dec. 22, 2001

(65) Prior Publication Data

US 2002/0141139 A1 Oct. 3, 2002

(30) Foreign Application Priority Data

Feb. 1, 2001 (JP) .......................... 2001-025049

(51) Int. Cl.[7] .................... H01G 4/06; C01G 23/00; C04B 35/46
(52) U.S. Cl. .............. 361/321.2; 423/598; 501/137
(58) Field of Search .............. 423/598; 501/137; 361/320, 321.1–321.5

(56) References Cited

U.S. PATENT DOCUMENTS 6,013,238 A * 1/2000 Murata et al. .............. 423/598

\* cited by examiner

Primary Examiner—Dean A. Reichard
Assistant Examiner—Eric Thomas
(74) Attorney, Agent, or Firm—Dickstein, Shapiro, Morin & Oshinsky, LLP.

(57) ABSTRACT

A solid-phase method for making a barium titanate powder involves the steps of compounding powdered barium carbonate and powdered titanium oxide and calcining the mixture. The powdered barium carbonate used is needle particles having an aspect ratio of the length of the long axis to the length of the short axis of at least about 2. The powdered barium carbonate preferably has a specific surface area of about 5 $m^2/g$ or more. The resulting barium titanate powder is finer and homogeneous.

10 Claims, 1 Drawing Sheet

METHOD FOR MAKING BARIUM TITANATE POWDER, BARIUM TITANATE POWDER PREPARED BY THE METHOD, DIELECTRIC CERAMIC COMPACT, AND MONOLITHIC CERAMIC CAPACITOR

BACKGROUND OF THE INVENTION

1. Field of the Invention

The present invention relates to a method for making a barium titanate powder, in particular, by a solid-phase reaction. The present invention also relates to a barium titanate powder prepared by the above method, a dielectric ceramic compact formed by sintering the barium titanate powder, and a monolithic ceramic capacitor including the dielectric ceramic compact.

2. Description of the Related Art

A dielectric ceramic is prepared by sintering a powder mixture mainly containing a barium titanate powder, and is used to form dielectric ceramic layers which are components of monolithic ceramic capacitors.

Such a barium titanate powder is required to be as homogeneous as possible. In other words, the composition thereof must be homogeneous. Although barium titanate powders prepared by hydrothermal synthesis or hydrolysis show high homogeneity, the powders are expensive. Thus, barium titanate powders have generally been prepared by a solid-phase reaction.

In the synthesis of barium titanate by the solid-phase reaction, powdered barium carbonate and powdered titanium oxide are mixed and the mixture is calcined. It is very important to disperse powdered barium carbonate and powdered titanium oxide as homogeneously as possible in order to produce a more homogeneous barium titanate powder by the solid-phase reaction.

In general, homogeneous dispersions of powdered barium carbonate and powdered titanium oxide are prepared by dispersion processes which follow mechanical pulverization such as a dispersion process using dispersing media. Since powdered barium carbonate is hardly pulverized, it is difficult to obtain fine barium carbonate particles. As a result, the mixture of the powdered barium carbonate and the powdered titanium oxide exhibits unsatisfactory dispersion. Thus, the homogeneity of the barium titanate powder prepared by the solid-phase reaction is inferior to that prepared by the hydrothermal synthesis or hydrolysis.

SUMMARY OF THE INVENTION

An object of the present invention is to provide a method for making a barium titanate powder having high homogeneity by a solid-phase reaction.

Another object of the present invention is to provide a barium titanate powder prepared by the above method.

Another object of the present invention is to provide a dielectric ceramic compact formed by sintering the barium titanate powder.

Another object of the present invention is to provide a monolithic ceramic capacitor including the above dielectric ceramic compact.

The present invention is directed to a method for making a barium titanate powder comprising the steps of compounding powdered barium carbonate and powdered titanium oxide, and calcining the mixture, wherein the powdered barium carbonate comprises needle particles having an aspect ratio of the length of the long axis to the length of the short axis of at least about 2, wherein the long axis and the short axis of each particle are determined by electron microscopy.

Since the synthetic reaction of barium titanate involves diffusion of barium carbonate into a titanium oxide matrix, a uniform dispersion of the powdered barium carbonate in the powdered titanium oxide is important to improve homogeneity of the barium titanate powder. Since the powdered barium carbonate needle particles used in the present invention is readily pulverized into fine particles, the dispersion of the powdered barium carbonate is improved. Thus, a homogeneous barium titanate powder is obtained by a solid-phase reaction.

Preferably, the aspect ratio of the needle particles of the powdered barium carbonate is as high as possible. In other words, the aspect ratio of the length of the long axis to the length of the short axis is preferably at least about 5.

Preferably, the powdered barium carbonate has a BET specific surface area of at least about 5 $m^2/g$.

The present invention is also directed to a barium titanate powder prepared by the above method. The barium titanate powder has a BET specific surface area of at least about 2 $m^2/g$. Furthermore, the barium titanate powder satisfies the relationships $D10/D50 \geq 0.25$ and $D90/D50 \leq 2.5$ in particle size distribution by a laser diffraction scattering method. Moreover, the variation in molar ratio of barium to titanium in the barium titanate powder is about 0.01 or less wherein the molar ratio is determined by a TEM-EDX method using 10 samples. Herein, D10, D50 and D90 represent average particle diameters at a 10% cumulative volume, a 50% cumulative volume and a 90% cumulative volume, respectively, of particles when counted from the smallest particle, according to the laser diffraction scattering method.

The present invention is also directed to a dielectric ceramic compact prepared by sintering a green ceramic compact comprising a powdered feedstock comprising the above barium titanate powder.

The present invention is also directed to a monolithic ceramic capacitor comprising a plurality of dielectric ceramic layers, each comprising the above dielectric ceramic compact, and a plurality of internal electrodes, each extending along the interface between the two adjoining dielectric ceramic layers so that the two adjacent internal electrodes separated by the dielectric ceramic layer therebetween form an electrostatic capacitor.

DESCRIPTION OF THE PREFERRED EMBODIMENTS

Figure 1:
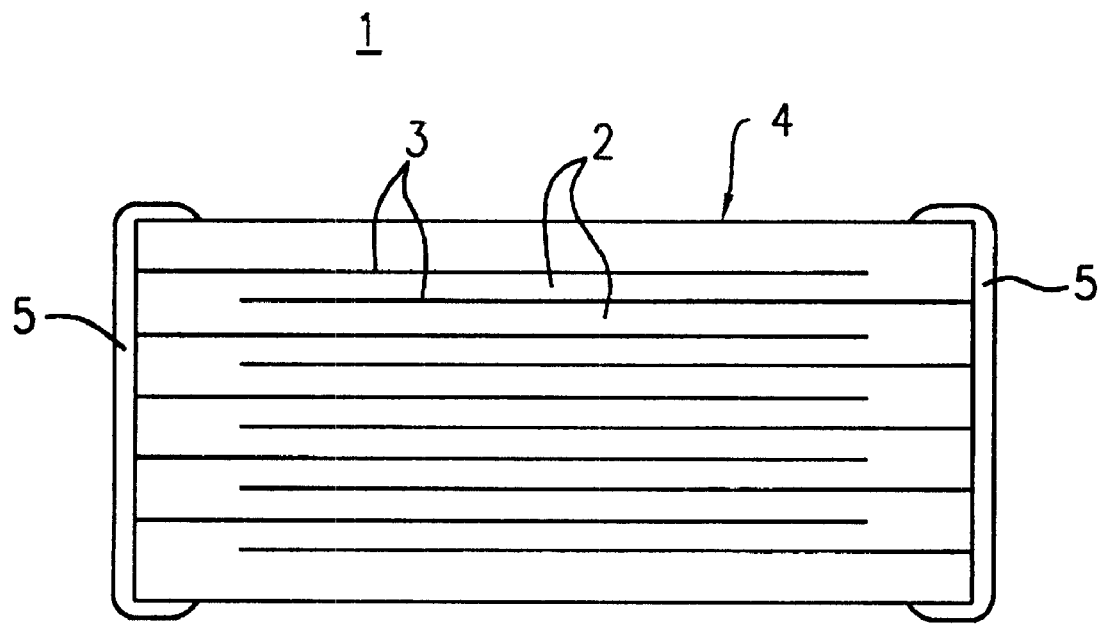
FIG. 1 is a schematic cross-sectional view illustrating the internal structure of a monolithic ceramic capacitor according to the present invention.

FIG. 1 is a schematic cross-sectional view illustrating the internal structure of a monolithic ceramic capacitor 1 according to the present invention.

The monolithic ceramic capacitor 1 includes a composite 4 including a plurality of laminated dielectric ceramic layers 2 and a plurality of internal electrodes 3 each extending along the interface between the two adjoining dielectric ceramic layers 2. The two adjacent internal electrodes 3, which are separated by one of the dielectric ceramic layers 2, form an electrostatic capacitor.

External electrodes 5 functioning as terminal electrodes are formed on both sides of the composite 4. The left external electrode 5 is electrically connected to predetermined internal electrodes 3, and the right external electrode 5 is electrically connected to other internal electrodes 3. The external electrodes 5 connected to the left external electrode 5 and the external electrodes 5 connected to the right external electrode 5 are alternately arranged in the vertical direction (the direction of the lamination).

Each dielectric ceramic layer 2 is composed of a dielectric ceramic compact which is prepared by sintering a green ceramic layer comprising a powdered feedstock including barium titanate powder. The barium titanate powder is produced by a method according to the present invention.

The barium titanate powder is prepared by a solid-phase reaction comprising the steps of compounding powdered barium carbonate and powdered titanium oxide, and calcining the mixture. The barium titanate powder may be pulverized after the calcination, if necessary.

The powdered barium carbonate used in this method comprises needle particles. These needle particles have an aspect ratio of the length of the long axis to the length of the short axis of at least about 2, wherein the long axis and the short axis of each particle are determined by electron microscopy.

In known methods of synthesizing barium titanate using spherical powdered barium carbonate and powdered titanium oxide powder, the powdered barium carbonate is subjected to mechanical pulverization for achieving homogeneous dispersion with the powdered titanium oxide. However, the spherical powdered barium carbonate is barely pulverized, and particles having desired particle sizes are not obtained. Accordingly, the resulting barium titanate primary particles do not have a homogeneous composition.

Based on the experimental results of dispersion of powdered titanium oxide and several types of powdered barium carbonate having different aspect ratios of the long axis to the short axis by known mechanical pulverization, the present inventors have found that the variations in particle size distribution and composition of each particle of the synthesized barium titanate powder are reduced when the aspect ratio of the long axis to the short axis is about 2 or more, and have completed the present invention.

Preferably, the powdered barium carbonate has a BET specific surface area of at least about 5 $m^2/g$ to further improve the homogeneity of the resulting barium titanate powder.

The barium titanate powder prepared using the above needle barium carbonate has a BET specific surface area of at least about 2 $m^2/g$ and satisfies the relationships $D10/D50 \geq 0.25$ and $D90/D50 \leq 2.5$ in particle size distribution by a laser diffraction scattering method. Moreover, the variation in molar ratio of barium to titanium in the barium titanate powder is about 0.01 or less, wherein the molar ratio is determined by a TEM-EDX method using 10 samples. This barium titanate powder is preferably used as a material for the dielectric ceramic layers 2 of the monolithic ceramic capacitor 1 shown in FIG. 1 and contributes to higher capacitance, miniaturization, and improvements in quality and reliability of the monolithic ceramic capacitor 1.

The present invention will now be described with reference to EXAMPLES.

EXAMPLES

As shown in Table 1, $BaCO_3$ powders having different aspect ratios and specific surface areas and a $TiO_2$ powder having a specific area of 5.0 were prepared as starting materials.

TABLE 1

|  | $BaCO_3$ Powder | | $TiO_2$ Powder |
|---|---|---|---|
|  | Aspect Ratio | Specific Surface Area ($m^2/g$) | Specific Surface Area ($m^2/g$) |
| EXAMPLE 1 | 2 | 2.2 | 5.0 |
| EXAMPLE 2 | 5 | 2.2 | 5.0 |
| EXAMPLE 3 | 2 | 5.1 | 5.0 |
| COMPARATIVE EXAMPLE 1 | 1.8 | 2.2 | 5.0 |

In each of EXAMPLES 1 to 3 and COMPARATIVE EXAMPLE 1, the corresponding $BaCO_3$ powder and the $TiO_2$ powder were weighed and mixed by a wet process so that the molar ratio of barium to titanate was 1.000.

Each mixture was dried and calcined at 1,100° C. for 2 hours in a batch oven. The resultant calcined material was pulverized in a dry pulverizing machine to prepare a barium titanate powder.

Table 2 shows the properties of the resulting barium titanate powders.

TABLE 2

|  | Specific Surface Area ($m^2/g$) | Particle Size Distribution | | Variation in Ba/Ti Molar Ratio |
|---|---|---|---|---|
|  |  | D10/D50 | D90/D50 |  |
| EXAMPLE 1 | 2.4 | 0.32 | 2.10 | 0.007 |
| EXAMPLE 2 | 2.5 | 0.35 | 1.95 | 0.003 |
| EXAMPLE 3 | 2.4 | 0.34 | 2.07 | 0.005 |
| COMPARATIVE EXAMPLE 1 | 2.4 | 0.21 | 2.83 | 0.015 |

As shown in Tables 1 and 2, the barium titanate powders using $BaCO_3$ powder having an aspect ratio of about 2 or more according to each of EXAMPLES 1 to 3, have a specific surface area of at least about 2 $m^2/g$, the particle size distribution satisfies the relationships $D10/D50 \geq 0.25$ and $D90/D50 \leq 2.5$, and the variation in molar ratio of barium to titanium in the barium titanate powder is about 0.01 or less. Accordingly, the barium titanate powder has a satisfactory particle distribution and a reduced variation in composition compared with COMPARATIVE EXAMPLE 1 using the $BaCO_3$ powder having an aspect ratio of less than about 2.

Comparing EXAMPLE 1 and EXAMPLE 2, as shown in Table 1, the aspect ratio of the long axis to the short axis of the $BaCO_3$ powder is 2 in EXAMPLE 1 and 5 in EXAMPLE 5. The variation in molar ratio of barium to titanium (Ba/Ti) of the resulting barium titanate powder is 0.007 for EXAMPLE 1 and 0.003 for EXAMPLE 2, as shown in Table 2. Thus, the variation in EXAMPLE 2 is smaller than that in EXAMPLE 1.

The results show that the variation in composition becomes smaller as the aspect ratio of the long axis to the short axis of the $BaCO_3$ powder becomes larger, for example, about 5 or more, in other words, as the needle $BaCO_3$ particles become longer.

Comparing EXAMPLE 1 and EXAMPLE 3, as shown in Table 1, the specific surface area of the $BaCO_3$ powder is 2.2 $m^2/g$ in EXAMPLE 1 and 5.1 $m^2/g$ in EXAMPLE 3. The variation in molar ratio of barium to titanium (Ba/Ti) of the resulting barium titanate powder is 0.007 for EXAMPLE 1 and 0.005 for EXAMPLE 3, as shown in Table 2. Thus, the variation in EXAMPLE 3 is smaller than that in EXAMPLE 1. Thus, by using a BaCO$_3$ powder having a larger specific surface area of about 5 m$^2$/g or more, the variation in composition of the resulting barium titanate powder is reduced.

As described above, the powdered barium carbonate of needle particles used in the method for making the barium titanate powder has an aspect ratio of at least about 2 and is readily pulverized into fine particles; hence, the dispersion of the powdered barium carbonate into the powdered titanium oxide in the calcining step is improved.

Thus, the resulting barium titanate powder has a BET specific surface area of at least about 2 m$^2$/g and satisfies the relationships D10/D50≧0.25 and D90/D50≦2.5 in particle size distribution. Moreover, the variation of the molar ratio of barium to titanium in the barium titanate powder is about 0.01 or less. Accordingly, the barium titanate powder has a homogeneous composition.

The monolithic ceramic capacitor according to the present invention has dielectric ceramic layers comprising a dielectric ceramic compact prepared by sintering the powdered stock primarily composed of this barium titanate powder. Thus, the monolithic ceramic capacitor has higher capacitance, reduced volume and improved quality and reliability.

Since the barium titanate powder is prepared by a solid-phase reaction, the production costs are reduced compared with those prepared by hydrothermal synthesis and hydrolysis.

When the aspect ratio of the long axis to the short axis of the powdered barium carbonate used in this method is about 5 or more, the variation in composition of the resulting barium titanate powder is further reduced.

When the specific surface area of the powdered barium carbonate used in this method is about 5 m$^2$/g or more, the variation in composition of the resulting barium titanate powder is further reduced.

Although the present invention has been described in relation to particular embodiments thereof, many other variations and modifications and other uses will become apparent to those skilled in the art.

What is claimed is:

1. A method for making a barium titanate powder comprising compounding powdered barium carbonate and powdered titanium oxide, and calcining the resulting mixture,
    wherein said powdered barium carbonate comprises needle particles having an aspect ratio of the length of the long axis to the length of the short axis as determined by electron microscopy of at least about 2.

2. The method for making a barium titanate powder according to claim 1, wherein the aspect ratio of the length of the long axis to the length of the short axis is at least about 5.

3. The method for making a barium titanate powder according to claim 2, wherein said powdered barium carbonate has a BET specific surface area of at least about 5 m$^2$/g.

4. The method for making a barium titanate powder according to claim 1, wherein said powdered barium carbonate has a BET specific surface area of at least about 5 m$^2$/g.

5. A barium titanate powder prepared by a method of claim 1, wherein
    said barium titanate power has a BET specific surface area of at least about m$^2$/g; said barium titanate power satisfies the relationships D10/D50≧0.25 and D90/D50≦2.5 in particle size distribution by laser diffraction scattering; and
    the variation in molar ratio of barium to titanium in said barium titanate power as determined by transmission electron microsrope-energy dispersive analysis using 10 samples is about 0.01 or less,
    wherein D10, D50 and D90 are the average particle diameters at a 10% cumulative volume, at a 50% cumulative volume, and at a 90% cumulative volume, respectively, of particles when counted from the smallest particle.

6. A green ceramic material comprising a barium titanate powder according to claim 5 in combination with an organic vehicle.

7. The green ceramic material according to claim 6 in the form of a sheet.

8. A dielectric ceramic compact comprising a sintered green ceramic sheet according to claim 7.

9. A monolithic ceramic capacitor comprising:
    a stack of a plurality of dielectric ceramic layers, each comprising a dielectric ceramic compact according to claim 8; and
    a plurality of separated internal electrodes, each extending along an interface between the two adjoining dielectric ceramic layers so that the two adjacent internal electrodes separated by at least one dielectric ceramic layer therebetween form an electrostatic capacitor.

10. A monolithic ceramic capacitor according to claim 9 having a first external electrode electrically connected to at least one internal electrode and a second external electrode electrically connected to at least one internal electrode which is not electrically connected to the first external electrode.

* * * * *